US010229267B2

United States Patent
Guo et al.

(10) Patent No.: US 10,229,267 B2
(45) Date of Patent: Mar. 12, 2019

(54) METHOD AND DEVICE FOR VIRUS IDENTIFICATION, NONVOLATILE STORAGE MEDIUM, AND DEVICE

(71) Applicant: BAIDU INTERNATIONAL TECHNOLOGY (SHENZHEN) CO., LTD., Guangdong (CN)

(72) Inventors: Mingqiang Guo, Shenzhen (CN); Gaohe Chen, Shenzhen (CN); Yongcheng Zhang, Shenzhen (CN)

(73) Assignee: BAIDU INTERNATIONAL TECHNOLOGY (SHENZHEN) CO., LTD., Beijing (CN)

( * ) Notice: Subject to any disclaimer, the term of this patent is extended or adjusted under 35 U.S.C. 154(b) by 125 days.

(21) Appl. No.: 15/033,862

(22) PCT Filed: Dec. 2, 2014

(86) PCT No.: PCT/CN2014/092759
§ 371 (c)(1),
(2) Date: May 2, 2016

(87) PCT Pub. No.: WO2015/081837
PCT Pub. Date: Jun. 11, 2015

(65) Prior Publication Data
US 2017/0004307 A1  Jan. 5, 2017

(30) Foreign Application Priority Data
Dec. 2, 2013 (CN) .......................... 2013 1 0634308

(51) Int. Cl.
*G06F 21/56* (2013.01)
(52) U.S. Cl.
CPC ............ *G06F 21/562* (2013.01); *G06F 21/56* (2013.01); *G06F 21/567* (2013.01); *G06F 2221/034* (2013.01)

(58) Field of Classification Search
CPC ...... G06F 21/56; G06F 21/561; G06F 21/562; G06F 21/567; G06F 2221/034
See application file for complete search history.

(56) References Cited

U.S. PATENT DOCUMENTS 5,440,723 A * 8/1995 Arnold .................. G06F 21/564
714/2
6,813,712 B1 * 11/2004 Luke ..................... G06F 21/566
714/28

(Continued)

FOREIGN PATENT DOCUMENTS

CN     101382984 A     3/2009
CN     102609515 A     7/2012

(Continued)

OTHER PUBLICATIONS

Kit. "Virus Hiding Folders/Files in Memory Card". CCM Benchmark. Jan. 3, 2013. Accessed on Oct. 25, 2017. http://ccm.net/forum/affich-614057-virus-hiding-folders-files-in-memory-card.*

(Continued)

*Primary Examiner* — Theodore C Parsons
(74) *Attorney, Agent, or Firm* — Lathrop Gage LLP (57) ABSTRACT

Provided in embodiments of the present invention are a method and device for virus identification, a nonvolatile storage medium, and a device. The embodiments of the present invention, by scanning files in a designated directory, acquire the file name of an executable file, and then determine a file name that is either identical or similar to the file name of the executable file, allow for identification of the executable file as a folder virus on the basis of an attribute of a folder corresponding to the identical or similar file name, obviate the need for relying on virus feature information of folder viruses, are easy to operate and not error-prone, thus increasing the efficiency and reliability of virus identification.

12 Claims, 2 Drawing Sheets

(56) References Cited

U.S. PATENT DOCUMENTS

| | | | |
|---|---|---|---|
| 7,340,777 B1* | 3/2008 | Szor | G06F 21/562 |
| | | | 713/165 |
| 8,302,193 B1 | 10/2012 | Gardner et al. | |
| 8,683,594 B2 | 3/2014 | Byung-Cook et al. | |
| 2010/0042649 A1* | 2/2010 | Shuf | G06Q 10/06311 |
| | | | 715/751 |
| 2012/0036571 A1* | 2/2012 | Yoo | G06F 21/567 |
| | | | 726/13 |
| 2014/0053266 A1 | 2/2014 | Wang | |
| 2014/0156981 A1* | 6/2014 | Hamid | G06F 21/575 |
| | | | 713/2 |
| 2015/0007328 A1* | 1/2015 | Zou | G06F 21/552 |
| | | | 726/24 |

FOREIGN PATENT DOCUMENTS

| | | |
|---|---|---|
| CN | 102768717 A | 11/2012 |
| CN | 102955912 A | 3/2013 |
| CN | 103699838 A | 4/2014 |
| CN | 103714269 A | 4/2014 |
| WO | 2010067070 A1 | 6/2010 |

OTHER PUBLICATIONS

PCT/CN2014/092759, International Search Report and Written Opinion, dated Jun. 11, 2015, 9 pages (English Translation of International Search Report).

Symantec Connect forum, "virus creates a .EXE file for each folder name" Jun. 15, 2010 https://www.symantec.com/connect/forums/virus-creates-exe-file-each-folder-name, accessed on the Internet Mar. 17, 2017; 8 pages.

* cited by examiner

METHOD AND DEVICE FOR VIRUS IDENTIFICATION, NONVOLATILE STORAGE MEDIUM, AND DEVICE

This application is a national-phase application claiming the priority of PCT application No. PCT/CN2014/092759, filed Dec. 2, 2014, which claims priority to Chinese Patent Application No. 201310634308.7, filed on Dec. 2, 2013 and entitled "METHOD AND DEVICE FOR VIRUS IDENTIFICATION, NONVOLATILE STORAGE MEDIUM, AND DEVICE". The disclosure of the above applications is incorporated herein by reference in its entity.

BACKGROUND

Technical Field

The present invention relates to computer technologies, and in particular, to a method and device for virus identification, a nonvolatile storage medium, and a device.

Related Art

A folder virus is a virus that confuses a user by using a folder icon, to cause the user to double-click the folder icon to implement replication. The folder virus traverses folders in a root directory of a mobile storage device, replicates itself to the root directory of the mobile storage device, changes a name to a file name of a detected folder, and modifies an attribute of the folder to invisible. In this way, the virus runs when the user uses the mobile storage device and opens its folder, to achieve the objective of replication. In the prior art, feature matching is performed on a scanned file by using a virus database, and the file is identified as a folder virus if the matching succeeds. An original virus database requires operating personnel to acquire folder viruses one by one and perform manual identification and feature extraction on each folder virus file, so as to establish the virus database.

However, the existing virus database establishment is complex to operate and error-prone, leading to decrease in the efficiency and reliability of virus identification.

SUMMARY

Multiple aspects of the present invention provide a method and device for virus identification, a nonvolatile storage medium, and a device, so as to improve the efficiency and reliability of virus identification.

One aspect of the present invention provides a method for virus identification, including:

scanning files in a designated directory to obtain a file name of an executable file;

determining a file name that is identical or similar to the file name of the executable file; and identifying the executable file as a folder virus according to an attribute of a folder corresponding to the identical or similar file name.

According to the aspect and any possible implementation manner described above, an implementation manner is further provided, where the scanning files in a designated directory to obtain a file name of an executable file includes:

scanning files in a root directory to obtain a file name of an executable file.

According to the aspect and any possible implementation manner described above, an implementation manner is further provided, where the identifying the executable file as a folder virus according to an attribute of a folder corresponding to the identical or similar file name includes:

identifying the executable file as a folder virus if the attribute of the folder is invisible.

According to the aspect and any possible implementation manner described above, an implementation manner is further provided, where the identifying the executable file as a folder virus according to an attribute of a folder corresponding to the identical or similar file name includes:

adding 1 to a value of an accumulator if the attribute of the folder is invisible; and identifying the executable file as a folder virus if the value of the accumulator is greater than or equal to a preset identification threshold.

According to the aspect and any possible implementation manner described above, an implementation manner is further provided, where after the identifying the executable file as a folder virus according to an attribute of a folder corresponding to the identical or similar file name, the method further includes:

obtaining virus feature information of the folder virus according to the identified folder virus; and adding the virus feature information to a virus database, so as to perform feature matching on a scanned file by using the virus database, and identify the file as a folder virus if the matching succeeds.

Another aspect of the present invention provides a device for virus identification, including:

a scanning unit, configured to scan files in a designated directory to obtain a file name of an executable file;

a determining unit, configured to determine a file name that is identical or similar to the file name of the executable file; and an identifying unit, configured to identify the executable file as a folder virus according to an attribute of a folder corresponding to the identical or similar file name.

According to the aspect and any possible implementation manner described above, an implementation manner is further provided, where the scanning unit is specifically configured to:

scan files in a root directory to obtain a file name of an executable file.

According to the aspect and any possible implementation manner described above, an implementation manner is further provided, where the scanning unit is specifically configured to:

identify the executable file as a folder virus if the attribute of the folder is invisible.

According to the aspect and any possible implementation manner described above, an implementation manner is further provided, where the scanning unit is specifically configured to:

add 1 to a value of an accumulator if the attribute of the folder is invisible; and identify the executable file as a folder virus if the value of the accumulator is greater than or equal to a preset identification threshold.

According to the aspect and any possible implementation manner described above, an implementation manner is further provided, where the device further includes an update unit, configured to:

obtain virus feature information of the folder virus according to the identified folder virus; and add the virus feature information to a virus database, so as to perform feature matching on a scanned file by using the virus database, and identify the file as a folder virus if the matching succeeds.

Another aspect of the present invention provides a nonvolatile storage medium, where the nonvolatile storage medium includes a computer program, where when the computer program is executed by one or more computers, the one or more computers are caused to perform the following operations:

scanning files in a designated directory to obtain a file name of an executable file;

determining a file name that is identical or similar to the file name of the executable file; and identifying the executable file as a folder virus according to an attribute of a folder corresponding to the identical or similar file name.

Another aspect of the present invention provides a device, including at least one processor, a memory, and at least one computer program, where the at least one computer program is stored in the memory and executed by the at least one processor, where the computer program includes an instruction for performing the following operations:

scanning files in a designated directory to obtain a file name of an executable file;

determining a file name that is identical or similar to the file name of the executable file; and identifying the executable file as a folder virus according to an attribute of a folder corresponding to the identical or similar file name.

It can be known from the foregoing technical solutions, in the embodiments of the present invention, files in a designated directory are scanned to obtain a file name of an executable file, and then a file name that is identical or similar to the file name of the executable file is determined, so that the executable file can be identified as a folder virus according to an attribute of a folder corresponding to the identical or similar file name, without relying on virus feature information of folder viruses, which is easy to operate and not error-prone, thus increasing the efficiency and reliability of virus identification.

In addition, according to the technical solutions provided in the present invention, proactive identification can be performed on an infected folder virus, the efficiency and reliability of virus identification can be effectively improved, and the system security performance can be effectively improved.

In addition, according to the technical solutions provided in the present invention, a virus database can be automatically established, operating personnel are not required to acquire folder viruses one by one and perform manual identification and feature extraction on each folder virus file, the real-time performance is good, the accuracy is high, the efficiency and reliability of virus identification can be effectively improved, and the system security performance is further improved.

BRIEF DESCRIPTION OF THE DRAWINGS

To illustrate the technical solutions in the embodiments of the present invention more clearly, the accompanying drawings required for describing the embodiments or the prior art are briefly described in the following. Apparently, the accompanying drawings in the following description merely show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

Figure 1:
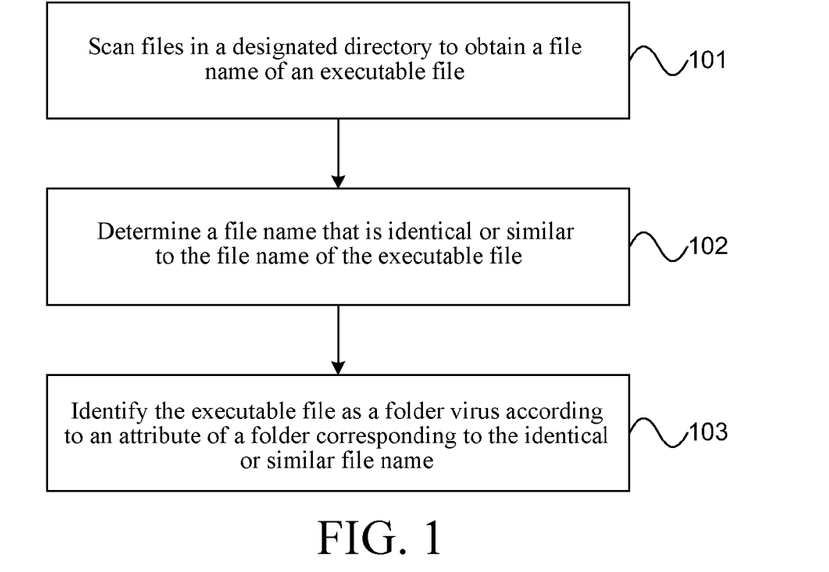
FIG. 1 is a schematic flowchart of a method for virus identification according to an embodiment of the present invention.

FIG. 1 is a schematic flowchart of a method for virus identification according to an embodiment of the present invention, as shown in FIG. 1.

101: Scan files in a designated directory to obtain a file name of an executable file.

An executable file is a file in a portable executable (PE) file format, which may be loaded into internal memory, and executed by an operating system loading program. An extension of the executable file may include, but not limited to, .exe, .sys, .scr, and the like.

102: Determine a file name that is identical or similar to the file name of the executable file.

103: Identify the executable file as a folder virus according to an attribute of a folder corresponding to the identical or similar file name.

A virus is also referred to as a computer virus, and may include, but not limited to, a Trojan horse, a backdoor, a local area network worn, an email worn, spyware, an infective virus, or Rootkits/Bootkits.

It should be noted that, 101 to 103 may be performed by an anti-virus engine, which may be located in a local client, so as to perform an offline operation to eliminate a virus, or may be located in a server on a network side, so as to perform an online operation to eliminate a virus, which is not limited in this embodiment.

It may be understood that, as long as virus elimination can be implemented so as to provide a secure system environment, the client may be an application installed on a terminal, or a web page in a browser, or be in another objective existence form, which is not limited in this embodiment.

In this way, files in a designated directory are scanned to obtain a file name of an executable file, and then a file name that is identical or similar to the file name of the executable file is determined, so that the executable file can be identified as a folder virus according to an attribute of a folder corresponding to the identical or similar file name, without relying on virus feature information of folder viruses, which is easy to operate and not error-prone, thus increasing the efficiency and reliability of virus identification.

Generally, a complete name of a file includes a file name and an extension. An extension of an executable file may include, but not limited to, .exe, .sys, .scr, and the like. A folder does not have an extension. In 101, the obtained file name of the executable file is obtained after an extension is cut.

Generally, a folder virus traverses folders in a root directory of a mobile storage device, replicates itself to the root directory of the mobile storage device, changes a name to a file name of a detected folder, and modifies an attribute of the folder to invisible. In this way, the virus runs when the user uses the mobile storage device and opens its folder, to achieve the objective of replication. However, some folder viruses do not directly change a name to a file name of a detected folder after replicating themselves to the root directory of the mobile storage device, but add some symbols that are invisible or difficult to find to the file name of the detected folder. Therefore, a file name that is identical or similar to the file name of the executable file needs to be determined, to accurately identify a file name of a folder that may be replicated by a folder virus.

Optionally, in a possible implementation manner of this embodiment, in 102, a similarity between file names may be specifically calculated, to determine the file name that is identical or similar to the file name of the executable file. For example, if a similarity is greater than or equal to a preset threshold, it may be determined that two file names are identical or similar. Specifically, the file name similarity may be calculated by using a text similarity algorithm in the prior art, for a detailed description, reference may be made to a related description in the prior art, and details are not described herein.

Optionally, in a possible implementation manner of this embodiment, in 101, files in a root directory may be specifically scanned to obtain a file name of an executable file. Specifically, files in a root directory of a mobile storage device may be scanned to obtain a complete name of an executable file, and then delete an extension of the executable file, so as to obtain a file name of the executable file.

Optionally, in a possible implementation manner of this embodiment, in 103, the executable file is identified as a folder virus if the attribute of the folder is invisible. Specifically, it may be determined whether there is a folder whose file name is identical or similar to that of the executable file, and if there is no folder whose file name is identical or similar to that of the executable file, the operation may be ended, and it indicates that the executable file is not a folder virus. If there is a folder whose file name is identical or similar to that of the executable file, an attribute of the folder continues to be determined. For example, an attribute obtaining operation may be performed on the folder, it may be determined whether a returned value includes a FILE_ATTRIBUTE_DIRECTORY bit, and if the returned value does not include a FILE_ATTRIBUTE_DIRECTORY bit, the operation may be ended, and it indicates that the executable file is not a folder virus. If the returned value includes a FILE_ATTRIBUTE_DIRECTORY bit, it indicates that it is a folder, and then it is further determined whether the returned value includes a FILE_ATTRIBUTE_HIDDEN bit or a FILE_ATTRIBUTE_SYSTEM bit, and if the returned value does not include a FILE_ATTRIBUTE_HIDDEN bit and a FILE_ATTRIBUTE_SYSTEM bit, the operation may be ended, and it indicates that the executable file is not a folder virus. If the returned value includes a FILE_ATTRIBUTE_HIDDEN bit or a FILE_ATTRIBUTE_SYSTEM bit, it indicates that the attribute of the folder is invisible, and the executable file may be identified as a folder virus. Further, a virus alarm operation, a virus elimination operation, and the like may be further performed. The virus elimination operation may be modifying the attribute of the folder to visible, and deleting the identified folder virus, that is, the executable file.

In this way, according to the technical solutions provided in the present invention, proactive identification can be performed on an infected folder virus, the efficiency of virus identification can be effectively improved, and the system security performance can be effectively improved.

Because a replication behavior of a folder virus is a behavior directed at all folders in a directory, for a storage device such as a mobile storage device, as there are at least two folders in a root directory, if the storage device is infected by the folder virus, all folders in the root directory are infected. Optionally, in a possible implementation manner of this embodiment, in 103, 1 may be added to a value of an accumulator if the attribute of the folder is invisible; and then the executable file is identified as a folder virus if the value of the accumulator is greater than or equal to a preset identification threshold. Specifically, it may be determined whether there is a folder whose file name is identical or similar to that of the executable file, and if there is no folder whose file name is identical or similar to that of the executable file, the operation may be ended, and it indicates that the executable file is not a folder virus. If there is a folder whose file name is identical or similar to that of the executable file, an attribute of the folder continues to be determined. For example, an attribute obtaining operation may be performed on the folder, it may be determined whether a returned value includes a FILE_ATTRIBUTE_DIRECTORY bit, and if the returned value does not include a FILE_ATTRIBUTE_DIRECTORY bit, the operation may be ended, and it indicates that the executable file is not a folder virus. If the returned value includes a FILE_ATTRIBUTE_DIRECTORY bit, it indicates that it is a folder, and then it is further determined whether the returned value includes a FILE_ATTRIBUTE_HIDDEN bit or a FILE_ATTRIBUTE_SYSTEM bit, and if the returned value does not include a FILE_ATTRIBUTE_HIDDEN bit and a FILE_ATTRIBUTE_SYSTEM bit, the operation may be ended, and it indicates that the executable file is not a folder virus. If the returned value includes a FILE_ATTRIBUTE_HIDDEN bit or a FILE_ATTRIBUTE_SYSTEM bit, it indicates that attribute of the folder is invisible, and 1 may be added to a value of an accumulator, for example, an initial value of the accumulator may be set to 0. Similarly, a folder whose file name is identical or similar to that of a next executable file continues to be processed until all executable files are processed. The executable file may be identified as a folder virus if the value of the accumulator is greater than or equal to a preset identification threshold, for example, the identification threshold is 2. Further, a virus alarm operation, a virus elimination operation, and the like may be further performed. The virus elimination operation may be modifying the attribute of the folder to visible, and deleting the identified folder virus, that is, the executable file.

In this way, according to the technical solutions provided in the present invention, proactive identification can be performed on an infected folder virus, the efficiency and reliability of virus identification can be effectively improved, and the system security performance can be effectively improved.

Optionally, in a possible implementation manner of this embodiment, after 103, virus feature information of the folder virus may be further obtained according to the identified folder virus. For a method for acquiring the virus feature information, reference may be made to a micro-feature calculation method in the prior art, and details are not described herein. Then, the virus feature information is added to a virus database, so as to perform feature matching on a scanned file by using the virus database, and identify the file as a folder virus if the matching succeeds.

The feature information may include a dynamic feature and/or a static feature. The dynamic feature may be understood as a basis for determining a virus based on a virus behavior, and the static feature may be understood as a basis for determining a virus based on a feature code of the virus.

Specifically, the virus database stores information related to the virus feature information, which includes, but is not limited, to virus length information, the virus feature information, and an identifier (ID) of the virus feature information, which is not limited in the present invention.

In this way, according to the technical solutions provided in the present invention, a virus database can be automatically established, operating personnel are not required to acquire folder viruses one by one and perform manual identification and feature extraction on each folder virus file, the real-time performance is good, the accuracy is high, the efficiency and reliability of virus identification can be effectively improved, and the system security performance is further improved.

In this embodiment, files in a designated directory are scanned to obtain a file name of an executable file, and then a file name that is identical or similar to the file name of the executable file is determined, so that the executable file can be identified as a folder virus according to an attribute of a folder corresponding to the identical or similar file name, without relying on virus feature information of folder viruses, which is easy to operate and not error-prone, thus increasing the efficiency and reliability of virus identification.

In addition, according to the technical solutions provided in the present invention, proactive identification can be performed on an infected folder virus, the efficiency and reliability of virus identification can be effectively improved, and the system security performance can be effectively improved.

In addition, according to the technical solutions provided in the present invention, a virus database can be automatically established, operating personnel are not required to acquire folder viruses one by one and perform manual identification and feature extraction on each folder virus file, the real-time performance is good, the accuracy is high, the efficiency and reliability of virus identification can be effectively improved, and the system security performance is further improved.

It should be noted that, for brevity, the foregoing method embodiments are represented as a series of actions. but persons skilled in the art should understand that the present invention is not limited to the order of the described actions, because according to the present invention, some steps may be performed in other orders or performed simultaneously. In addition, a person skilled in the art should also know that the embodiments described in this specification all belong to preferred embodiments, and the involved actions and modules are not mandatory to the present invention.

In the foregoing embodiments, the description of each embodiment has respective focuses. For a part that is not described in detail in an embodiment, reference may be made to related descriptions in other embodiments.

Figure 2:
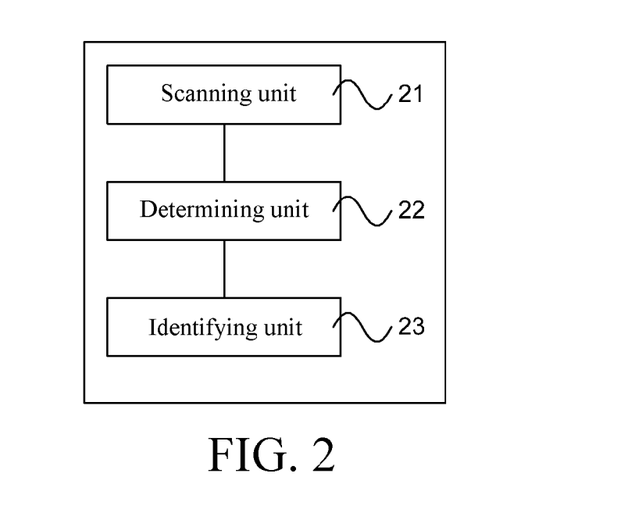
FIG. 2 is a schematic structural diagram of a device for virus identification according to another embodiment of the present invention.

FIG. 2 is a schematic structural diagram of a device for virus identification according to another embodiment of the present invention, as shown in FIG. 2. The device for virus identification in this embodiment may include a scanning unit 21, a determining unit 22, and an identifying unit 23. The scanning unit 21 is configured to scan files in a designated directory to obtain a file name of an executable file; the determining unit 22 is configured to determine a file name that is identical or similar to the file name of the executable file; and the identifying unit 23 is configured to identify the executable file as a folder virus according to an attribute of a folder corresponding to the identical or similar file name.

An executable file is a file in a portable executable file format, which may be loaded into internal memory, and executed by an operating system loading program. An extension of the executable file may include, but not limited to, .exe, .sys, .scr, and the like.

A virus is also referred to as a computer virus, and may include, but not limited to, a Trojan horse, a backdoor, a local area network worn, an email worn, spyware, an infective virus, or Rootkits/Bootkits.

It should be noted that, the device for virus identification provided in this embodiment may be an anti-virus engine, which may be located in a local client, so as to perform an offline operation to eliminate a virus, or may be located in a server on a network side, so as to perform an online operation to eliminate a virus, which is not limited in this embodiment.

It may be understood that, as long as virus elimination can be implemented so as to provide a secure system environment, the client may be an application installed on a terminal, or a web page in a browser, or be in another objective existence form, which is not limited in this embodiment.

In this way, the scanning unit scans files in a designated directory to obtain a file name of an executable file, and then the determining unit determines a file name that is identical or similar to the file name of the executable file, so that the identifying unit identifies the executable file as a folder virus according to an attribute of a folder corresponding to the identical or similar file name, without relying on virus feature information of folder viruses, which is easy to operate and not error-prone, thus increasing the efficiency and reliability of virus identification.

Generally, a complete name of a file includes a file name and an extension. An extension of an executable file may include, but not limited to, .exe, .sys, .scr, and the like. A folder does not have an extension. The file name, obtained by the scanning unit 21, of the executable file is obtained after an extension is cut.

Generally, a folder virus traverses folders in a root directory of a mobile storage device, replicates itself to the root directory of the mobile storage device, changes a name to a file name of a detected folder, and modifies an attribute of the folder to invisible. In this way, the virus runs when the user uses the mobile storage device and opens its folder, to achieve the objective of replication. However, some folder viruses do not directly change a name to a file name of a detected folder after replicating themselves to the root directory of the mobile storage device, but add some symbols that are invisible or difficult to find to the file name of the detected folder. Therefore, a file name that is identical or similar to the file name of the executable file needs to be determined, to accurately identify a file name of a folder that may be replicated by a folder virus.

Optionally, in a possible implementation manner of this embodiment, the determining unit 22 may specifically calculate a similarity between file names, to determine the file name that is identical or similar to the file name of the executable file. For example, if a similarity is greater than or equal to a preset threshold, the determining unit 22 may determine that two file names are identical or similar. Specifically, the determining unit 22 may calculate the file name similarity by using a text similarity algorithm in the prior art, for a detailed description, reference may be made to a related description in the prior art, and details are not described herein.

Optionally, in a possible implementation manner of this embodiment, the scanning unit 21 may be specifically configured to scan files in a root directory to obtain a file name of an executable file. Specifically, the scanning unit 21 may scan files in a root directory of a mobile storage device to obtain a complete name of an executable file, and then delete an extension of the executable file, so as to obtain a file name of the executable file.

Optionally, in a possible implementation manner of this embodiment, the identifying unit 23 may be specifically configured to identify the executable file as a folder virus if the attribute of the folder is invisible. Specifically, the identifying unit 23 may determine whether there is a folder whose file name is identical or similar to that of the executable file, and if there is no folder whose file name is identical or similar to that of the executable file, the identifying unit 23 may end the operation, and it indicates that the executable file is not a folder virus. If there is a folder whose file name is identical or similar to that of the executable file, the identifying unit 23 may continue to determine an attribute of the folder. For example, the identifying unit 23 may perform an attribute obtaining operation on the folder, and determine whether a returned value includes a FILE_ATTRIBUTE_DIRECTORY bit, and if the returned value does not include a FILE_ATTRIBUTE_DIRECTORY bit, the identifying unit 23 may end the operation, and it indicates that the executable file is not a folder virus. If the returned value includes a FILE_ATTRIBUTE_DIRECTORY bit, it indicates that it is a folder, and the identifying unit 23 further determines whether the returned value includes a FILE_ATTRIBUTE_HIDDEN bit or a FILE_ATTRIBUTE_SYSTEM bit, and if the returned value does not include a FILE_ATTRIBUTE_HIDDEN bit and a FILE_ATTRIBUTE_SYSTEM bit, the identifying unit 23 may end the operation, and it indicates that the executable file is not a folder virus. If the returned value includes a FILE_ATTRIBUTE_HIDDEN bit or a FILE_ATTRIBUTE_SYSTEM bit, it indicates that the attribute of the folder is invisible, and the identifying unit 23 may identify the executable file as a folder virus. Further, the identifying unit 23 may further perform a virus alarm operation, a virus elimination operation, and the like. The virus elimination operation may be modifying the attribute of the folder to visible, and deleting the identified folder virus, that is, the executable file.

In this way, according to the technical solutions provided in the present invention, proactive identification can be performed on an infected folder virus, the efficiency of virus identification can be effectively improved, and the system security performance can be effectively improved.

Because a replication behavior of a folder virus is a behavior directed at all folders in a directory, for a storage device such as a mobile storage device, as there are at least two folders in a root directory, if the storage device is infected by the folder virus, all folders in the root directory are infected. Optionally, in a possible implementation manner of this embodiment, the identifying unit 23 may be specifically configured to add 1 to a value of an accumulator if the attribute of the folder is invisible; and identify the executable file as a folder virus if the value of the accumulator is greater than or equal to a preset identification threshold. Specifically, the identifying unit 23 may determine whether there is a folder whose file name is identical or similar to that of the executable file, and if there is no folder whose file name is identical or similar to that of the executable file, the identifying unit 23 may end the operation, and it indicates that the executable file is not a folder virus. If there is a folder whose file name is identical or similar to that of the executable file, the identifying unit 23 may continue to determine an attribute of the folder. For example, the identifying unit 23 may perform an attribute obtaining operation on the folder, and determine whether a returned value includes a FILE_ATTRIBUTE_DIRECTORY bit, and if the returned value does not include a FILE_ATTRIBUTE_DIRECTORY bit, the identifying unit 23 may end the operation, and it indicates that the executable file is not a folder virus. If the returned value includes a FILE_ATTRIBUTE_DIRECTORY bit, it indicates that it is a folder, and the identifying unit 23 further determines whether the returned value includes a FILE_ATTRIBUTE_HIDDEN bit or a FILE_ATTRIBUTE_SYSTEM bit, and if the returned value does not include a FILE_ATTRIBUTE_HIDDEN bit and a FILE_ATTRIBUTE_SYSTEM bit, the identifying unit 23 may end the operation, and it indicates that the executable file is not a folder virus. If the returned value includes a FILE_ATTRIBUTE_HIDDEN bit or a FILE_ATTRIBUTE_SYSTEM bit, it indicates that attribute of the folder is invisible, and the identifying unit 23 may add 1 to a value of an accumulator, for example, an initial value of the accumulator may be set to 0. Similarly, the identifying unit 23 continues to process a folder whose file name is identical or similar to that of a next executable file until all executable files are processed. The identifying unit 23 may identify the executable file as a folder virus if the value of the accumulator is greater than or equal to a preset identification threshold, for example, the identification threshold is 2. Further, the identifying unit 23 may further perform a virus alarm operation, a virus elimination operation, and the like. The virus elimination operation may be modifying the attribute of the folder to visible, and deleting the identified folder virus, that is, the executable file.

In this way, according to the technical solutions provided in the present invention, proactive identification can be performed on an infected folder virus, the efficiency and reliability of virus identification can be effectively improved, and the system security performance can be effectively improved.

Figure 3:
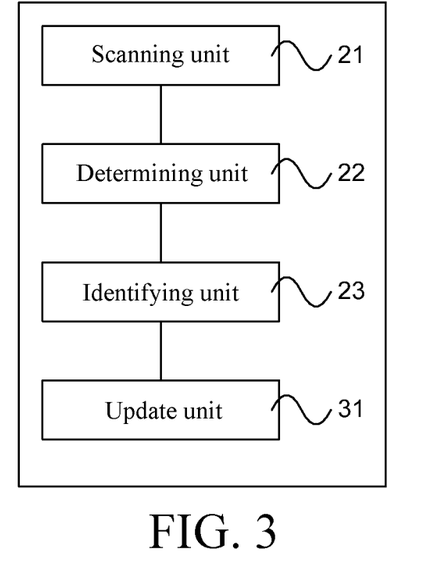
FIG. 3 is a schematic structural diagram of a device for virus identification according to another embodiment of the present invention.

Optionally, in a possible implementation manner of this embodiment, as shown in FIG. 3, the device for virus identification provided in this embodiment may further include an update unit 31, configured to obtain virus feature information of the folder virus according to the identified folder virus; and add the virus feature information to a virus database, so as to perform feature matching on a scanned file by using the virus database, and identify the file as a folder virus if the matching succeeds.

For a method for the update unit 31 to acquire the virus feature information, reference may be made to a microfeature calculation method in the prior art, and details are not described herein.

The feature information may include a dynamic feature and/or a static feature. The dynamic feature may be understood as a basis for determining a virus based on a virus behavior, and the static feature may be understood as a basis for determining a virus based on a feature code of the virus.

Specifically, the virus database stores information related to the virus feature information, which includes, but is not limited, to virus length information, the virus feature information, and an identifier of the virus feature information, which is not limited in the present invention.

In this way, according to the technical solutions provided in the present invention, a virus database can be automatically established, operating personnel are not required to acquire folder viruses one by one and perform manual identification and feature extraction on each folder virus file, the real-time performance is good, the accuracy is high, the efficiency and reliability of virus identification can be effectively improved, and the system security performance is further improved.

In this embodiment, the scanning unit scans files in a designated directory to obtain a file name of an executable file, and then the determining unit determines a file name that is identical or similar to the file name of the executable file, so that the identifying unit identifies the executable file as a folder virus according to an attribute of a folder corresponding to the identical or similar file name, without relying on virus feature information of folder viruses, which is easy to operate and not error-prone, thus increasing the efficiency and reliability of virus identification.

In addition, according to the technical solutions provided in the present invention, proactive identification can be performed on an infected folder virus, the efficiency and reliability of virus identification can be effectively improved, and the system security performance can be effectively improved.

In addition, according to the technical solutions provided in the present invention, a virus database can be automatically established, operating personnel are not required to acquire folder viruses one by one and perform manual identification and feature extraction on each folder virus file, the real-time performance is good, the accuracy is high, the efficiency and reliability of virus identification can be effectively improved, and the system security performance is further improved.

It may be understood that, the technical solutions provided in the present invention may be applied to a storage device, and in particular, to a mobile storage device.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the embodiments provided in the present invention, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented through hardware, or may also be implemented in a form of hardware plus a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A computer-implemented method for virus identification on a computer comprising a processor, comprising:
scanning, using the processor, files in a designated directory to obtain a first file name of an executable file;
determining, using the processor, a second file name that is identical or similar to the first file name of the executable file;
identifying, using the processor, the executable file as a folder virus according to an attribute of a folder corresponding to the second file name;
obtaining, using the processor, virus feature information of the folder virus;
adding, using the processor, the virus feature information of the folder virus to a virus database;
performing, using the processor, feature matching on a scanned file by using the virus database;
identifying, using the processor, the scanned file as the folder virus if the matching succeeds; and,
performing, using the processor, a virus elimination operation on the scanned file if the matching succeeds;
wherein determining, using the processor, a second file name that is identical or similar to the first file name of the executable file comprises:
calculating, using the processor, similarity between the first and second file names;
comparing, using the processor, the similarity with a preset threshold; and
determining, using the processor, whether the second file name is identical or similar to the first file name based on a result of the comparing.

2. The method according to claim 1, wherein scanning, using the processor, the files in the designated directory to obtain the first file name of the executable file comprises:
scanning the files in a root directory to obtain the first file name of the executable file.

3. The method according to claim 1, wherein identifying, using the processor, the executable file as a folder virus according to the attribute of the folder corresponding to the identical or similar second file name comprises:

identifying the executable file as a folder virus if the attribute of the folder is invisible.

4. The method according to any one of claim 1, wherein identifying, using the processor, the executable file as a folder virus according to the attribute of the folder corresponding to the second file name comprises:
adding 1 to a value of an accumulator if the attribute of the folder is invisible; and
identifying the executable file as a folder virus if the value of the accumulator is greater than or equal to a preset identification threshold.

5. A device for virus identification, comprising:
a processor; and
a memory storing instructions, which when executed by the processor, cause the processor to perform operations including:
scanning files in a designated directory to obtain a first file name of an executable file;
determining a second file name that is identical or similar to the first file name of the executable file;
identifying the executable file as a folder virus according to an attribute of a folder corresponding to the second file name;
obtaining virus feature information of the folder virus;
adding the virus feature information of the folder virus to a virus database;
performing feature matching on a scanned file by using the virus database;
identifying the scanned file as the folder virus if the matching succeeds; and,
performing, using the processor, a virus elimination operation on the scanned file if the matching succeeds;
wherein determining, using the processor, a second file name that is identical or similar to the first file name of the executable file comprises:
calculating similarity between the first and second file names,
comparing the similarity with a preset threshold, and
determining whether the second file name is identical or similar to the first file name based on a result of the comparing.

6. The device according to claim 5, wherein scanning the files in the designated directory to obtain the first file name of the executable file comprises
scanning the files in a root directory to obtain the first file name of the executable file.

7. The device according to claim 5, wherein identifying the executable file as a folder virus according to the attribute of the folder corresponding to the second file name comprises:
identifying the executable file as a folder virus if the attribute of the folder is invisible.

8. The device according to any one of claim 5, wherein identifying the executable file as a folder virus according to the attribute of the folder corresponding to the second file name comprises:
adding 1 to a value of an accumulator if the attribute of the folder is invisible; and
identifying the executable file as a folder virus if the value of the accumulator is greater than or equal to a preset identification threshold.

9. A nonvolatile storage medium, wherein the nonvolatile storage medium comprises a computer program, wherein when the computer program is executed by one or more computers, the one or more computers are caused to perform the following operations:
scanning files in a designated directory to obtain a first file name of an executable file;
determining a second file name that is identical or similar to the first file name of the executable file;
identifying the executable file as a folder virus according to an attribute of a folder corresponding to the second file name;
obtaining virus feature information of the folder virus;
adding the virus feature information of the folder virus to a virus database;
performing feature matching on a scanned file by using the virus database;
identifying the scanned file as the folder virus if the matching succeeds; and,
performing, using the processor, a virus elimination operation on the scanned file if the matching succeeds;
wherein determining, using the processor, a second file name that is identical or similar to the first file name of the executable file comprises:
calculating similarity between the first and second file names;
comparing the similarity with a preset threshold; and
determining whether the second file name is identical or similar to the first file name based on a result of the comparing.

10. The nonvolatile storage medium according to claim 9, wherein scanning the files in the designated directory to obtain the first file name of the executable file comprises:
scanning the files in a root directory to obtain the file name of the executable file.

11. The nonvolatile storage medium according to claim 9, wherein identifying the executable file as a folder virus according to the attribute of the folder corresponding to the second file name comprises:
identifying the executable file as a folder virus if the attribute of the folder is invisible.

12. The nonvolatile storage medium according to claim 9, wherein identifying the executable file as a folder virus according to the attribute of the folder corresponding to the second file name comprises:
adding 1 to a value of an accumulator if the attribute of the folder is invisible; and
identifying the executable file as a folder virus if the value of the accumulator is greater than or equal to a preset identification threshold.

* * * * *